US011980821B2

(12) United States Patent
Mulase et al.

(10) Patent No.: US 11,980,821 B2
(45) Date of Patent: May 14, 2024

(54) INFORMATION PROCESSING APPARATUS, METHOD OF CONTROLLING INFORMATION PROCESSING APPARATUS, AND PROGRAM

(71) Applicant: Sony Interactive Entertainment Inc., Tokyo (JP)

(72) Inventors: Yurika Mulase, Tokyo (JP); Daisuke Kawamura, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 84 days.

(21) Appl. No.: 17/423,187

(22) PCT Filed: Jan. 16, 2020

(86) PCT No.: PCT/JP2020/001345
§ 371 (c)(1),
(2) Date: Jul. 15, 2021

(87) PCT Pub. No.: WO2020/153232
PCT Pub. Date: Jul. 30, 2020

(65) Prior Publication Data
US 2022/0062774 A1 Mar. 3, 2022

(30) Foreign Application Priority Data

Jan. 24, 2019 (JP) .................... 2019-010548

(51) Int. Cl.
*A63F 13/00* (2014.01)
*A63F 13/537* (2014.01)
(Continued)

(52) U.S. Cl.
CPC .......... *A63F 13/795* (2014.09); *A63F 13/537* (2014.09); *A63F 13/847* (2014.09)

(58) Field of Classification Search
CPC ..... A63F 13/795; A63F 13/537; A63F 13/847
See application file for complete search history.

(56) References Cited

U.S. PATENT DOCUMENTS 5,470,080 A * 11/1995 Naka ................. A63F 13/52
463/33
5,815,145 A * 9/1998 Matthews, III .... H04N 21/4348
348/E7.071
(Continued)

FOREIGN PATENT DOCUMENTS

JP     2005160579 A    6/2005
JP     4212611 B2    1/2009

OTHER PUBLICATIONS

International Preliminary Report on Patentability and Written Opinion for corresponding PCT Application No. PCT/JP2020/001345, 15 Pages, dated Aug. 5, 2021.
(Continued)

*Primary Examiner* — Dmitry Suhol
*Assistant Examiner* — Jason Pinheiro
(74) *Attorney, Agent, or Firm* — Matthew B. Dernier, Esq.

(57) ABSTRACT

An information processing apparatus is communicably connected to a server via a network and acquires, from the server, pieces of provision information including pieces of information regarding game play in other information processing apparatuses. The information processing apparatus operates in at least one mode among a game-play mode in which a user is allowed to play a game and a zoom-out mode in which the pieces of provision information acquired are presented, and, in the zoom-out mode, acquires provision information regarding game play of another user selected on the basis of a predetermined selection condition among the pieces of provision information and presents the acquired provision information.

8 Claims, 5 Drawing Sheets

US 11,980,821 B2

Page 2

(51) Int. Cl.
A63F 13/795 (2014.01)
A63F 13/847 (2014.01)

(56) References Cited

U.S. PATENT DOCUMENTS

| | | | | | |
|---|---|---|---|---|---|
| 5,816,918 | A | * | 10/1998 | Kelly | G07F 17/3248 463/16 |
| 5,940,073 | A | * | 8/1999 | Klosterman | H04N 7/17354 348/E7.071 |
| 5,973,682 | A | * | 10/1999 | Saib | H04N 21/4312 348/E5.104 |
| 6,015,344 | A | * | 1/2000 | Kelly | A63F 3/081 463/16 |
| 6,034,688 | A | * | 3/2000 | Greenwood | G06F 3/0489 715/804 |
| 6,061,063 | A | * | 5/2000 | Wagner | G06F 3/0485 715/804 |
| 6,144,375 | A | * | 11/2000 | Jain | G11B 27/105 715/251 |
| 6,492,997 | B1 | * | 12/2002 | Gerba | H04N 21/4314 715/721 |
| 7,340,765 | B2 | * | 3/2008 | Feldmeier | H04N 21/854 348/E7.071 |
| 7,559,834 | B1 | * | 7/2009 | York | A63F 13/10 463/2 |
| 7,600,189 | B2 | * | 10/2009 | Fujisawa | G09G 3/20 715/788 |
| 7,707,246 | B1 | * | 4/2010 | Issa | H04L 67/306 709/227 |
| 7,883,407 | B2 | * | 2/2011 | Johnson | G07F 17/3267 463/16 |
| 8,007,362 | B2 | * | 8/2011 | Aoyama | A63F 13/795 463/34 |
| 8,122,358 | B2 | | 2/2012 | Aonuma | |
| 8,246,468 | B2 | * | 8/2012 | Anderson | G07F 17/3232 463/16 |
| 8,527,526 | B1 | * | 9/2013 | Liu | G06Q 30/0277 707/751 |
| 8,584,174 | B1 | * | 11/2013 | Fyock | H04N 21/4316 725/60 |
| 8,760,400 | B2 | * | 6/2014 | Kerr | H04N 21/42204 345/157 |
| 8,932,136 | B2 | * | 1/2015 | Lemmons | A63F 3/081 463/40 |
| 9,266,017 | B1 | * | 2/2016 | Parker | A63F 13/77 |
| 9,403,090 | B2 | * | 8/2016 | Harris | A63F 13/5372 |
| 9,486,704 | B2 | * | 11/2016 | Nguyen | G07F 17/3244 |
| 9,724,612 | B2 | * | 8/2017 | Fowler | A63F 13/12 |
| 9,778,830 | B1 | * | 10/2017 | Dubin | A63F 13/327 |
| 10,207,191 | B2 | * | 2/2019 | Jensen | A63F 13/48 |
| 10,258,891 | B2 | * | 4/2019 | Araki | A63F 13/22 |
| 10,286,327 | B2 | * | 5/2019 | Xue | A63F 13/67 |
| 10,369,476 | B2 | * | 8/2019 | Pearce | A63F 13/79 |
| 10,376,792 | B2 | * | 8/2019 | Marr | G07F 17/3255 |
| 10,405,060 | B2 | * | 9/2019 | Tillman, Jr. | H04N 21/44218 |
| 10,448,111 | B2 | * | 10/2019 | Khoury | G09G 5/14 |
| 10,617,945 | B1 | * | 4/2020 | George | G06F 3/0481 |
| 10,765,952 | B2 | * | 9/2020 | Trombetta | A63F 13/798 |
| 2001/0044333 | A1 | * | 11/2001 | Okishio | A63F 13/573 463/2 |
| 2002/0098885 | A1 | * | 7/2002 | Sakaguchi | A63F 13/12 463/31 |
| 2002/0157099 | A1 | * | 10/2002 | Schrader | H04N 21/2665 725/51 |
| 2002/0173350 | A1 | * | 11/2002 | Kaneda | A63F 13/537 463/3 |
| 2003/0032479 | A1 | * | 2/2003 | LeMay | A63F 13/00 463/32 |
| 2003/0032480 | A1 | * | 2/2003 | Keith | A63F 13/335 463/42 |
| 2003/0079224 | A1 | * | 4/2003 | Komar | H04N 21/235 348/E7.071 |
| 2003/0153374 | A1 | * | 8/2003 | Gilmore | G07F 17/3276 463/6 |
| 2003/0224856 | A1 | * | 12/2003 | Bukovsky | A63F 13/795 463/42 |
| 2004/0085356 | A1 | * | 5/2004 | Kake | A63F 13/525 715/757 |
| 2005/0005308 | A1 | * | 1/2005 | Logan | H04N 21/4782 348/E7.071 |
| 2005/0066066 | A1 | * | 3/2005 | Karaoguz | H04N 21/4363 710/1 |
| 2005/0091694 | A1 | * | 4/2005 | Rambo | H04N 7/17318 348/E7.071 |
| 2006/0252530 | A1 | * | 11/2006 | Oberberger | G07F 17/3239 463/29 |
| 2006/0258463 | A1 | * | 11/2006 | Cugno | A63F 13/795 463/42 |
| 2007/0055989 | A1 | * | 3/2007 | Shanks | A63F 13/30 725/135 |
| 2008/0016446 | A1 | | 1/2008 | Aonuma | |
| 2008/0045335 | A1 | * | 2/2008 | Garbow | H04L 29/08846 463/29 |
| 2008/0060006 | A1 | * | 3/2008 | Shanks | H04N 21/4316 348/E7.071 |
| 2008/0305870 | A1 | * | 12/2008 | Henderson | A63F 13/26 463/31 |
| 2009/0048930 | A1 | * | 2/2009 | Taylor | G06Q 30/0242 705/14.36 |
| 2009/0055383 | A1 | * | 2/2009 | Zalewski | G11B 27/10 707/999.005 |
| 2009/0066648 | A1 | * | 3/2009 | Kerr | G06F 3/0485 345/158 |
| 2009/0094562 | A1 | * | 4/2009 | Jeong | G06F 3/04883 715/863 |
| 2009/0156303 | A1 | * | 6/2009 | Kiely | G07F 17/3223 463/29 |
| 2010/0016060 | A1 | * | 1/2010 | Jaffe | G07F 17/3244 463/20 |
| 2010/0153831 | A1 | * | 6/2010 | Beaton | G06Q 30/02 715/201 |
| 2011/0010658 | A1 | * | 1/2011 | Nash | G06F 16/54 715/784 |
| 2011/0289455 | A1 | * | 11/2011 | Reville | G06F 3/011 715/830 |
| 2012/0142414 | A1 | * | 6/2012 | Murakami | G06F 3/0488 463/32 |
| 2013/0088450 | A1 | * | 4/2013 | Takase | G06F 3/04886 345/173 |
| 2013/0111366 | A1 | * | 5/2013 | Silbey | A63F 13/795 715/757 |
| 2013/0163953 | A1 | * | 6/2013 | Peacock | G06F 9/5016 386/231 |
| 2013/0176219 | A1 | * | 7/2013 | Bae | H04N 21/44213 345/157 |
| 2013/0326374 | A1 | * | 12/2013 | Harvey | A63F 13/75 715/756 |
| 2013/0326398 | A1 | * | 12/2013 | Zuverink | G06F 3/0488 715/830 |
| 2013/0326563 | A1 | * | 12/2013 | Mulcahy | G06F 3/017 725/61 |
| 2014/0024450 | A1 | * | 1/2014 | Ramachandran | A63F 13/10 463/31 |
| 2014/0195337 | A1 | * | 7/2014 | Taylor | G06Q 30/0277 705/14.71 |
| 2014/0302915 | A1 | * | 10/2014 | Lyons | G07F 17/3237 463/25 |
| 2014/0317556 | A1 | * | 10/2014 | Ellenich | G06F 3/0485 715/784 |
| 2015/0370456 | A1 | * | 12/2015 | Kobayashi | G06F 3/0489 463/32 |
| 2015/0382076 | A1 | * | 12/2015 | Davisson | H04N 21/435 725/62 |
| 2016/0151707 | A1 | * | 6/2016 | Takaichi | A63F 13/25 463/30 |
| 2016/0156983 | A1 | * | 6/2016 | Vong | H04N 21/47205 725/47 |

(56) References Cited

U.S. PATENT DOCUMENTS

| | | | |
|---|---|---|---|
| 2016/0182924 A1* | 6/2016 | Todd ................... | H04N 21/4622 |
| | | | 725/116 |
| 2016/0300430 A1* | 10/2016 | Ortiz ..................... | G07F 17/326 |
| 2017/0001111 A1* | 1/2017 | Willette ................. | A63F 13/49 |
| 2017/0064240 A1* | 3/2017 | Mangat ................. | A63F 13/212 |
| 2017/0165569 A1* | 6/2017 | van Welzen ........... | H04N 7/147 |
| 2017/0223415 A1* | 8/2017 | Jeon .................... | H04N 21/6125 |
| 2017/0354892 A1* | 12/2017 | Benedetto .............. | A63F 13/31 |
| 2019/0388792 A1* | 12/2019 | Goslin .................. | A63F 13/537 |
| 2020/0016495 A1* | 1/2020 | Cruz .................... | A63F 13/355 |
| 2021/0278934 A1* | 9/2021 | Hunter .................. | G06F 3/0482 |
| 2022/0270432 A1* | 8/2022 | Mendell .............. | G07F 17/3211 |

OTHER PUBLICATIONS

International Search Report or corresponding PCT Application No. PCT/JP2020/001345, 4 Pages, dated Mar. 24, 2020.

* cited by examiner (a)

(b)

(c)

INFORMATION PROCESSING APPARATUS, METHOD OF CONTROLLING INFORMATION PROCESSING APPARATUS, AND PROGRAM

TECHNICAL FIELD

The present invention relates to an information processing apparatus, a method of controlling the information processing apparatus, and a program.

BACKGROUND ART

There are games played on an information processing apparatus such as a home game machine. Of these games, some games allow a user to cooperate with users of other information processing apparatuses connected via a network to accomplish objectives. For such play, it is common practice to preliminarily register specific users as "friends" and use this registered information when the user calls for cooperation.

SUMMARY

Technical Problem

However, in a conventional technique, when a user A intends to call for cooperation, it is not necessarily the case that other users B, C . . . are playing the same game as the game that the user A is currently playing. Further, there are cases where the timing to call for cooperation from these users B, C . . . is not appropriate, such as a case where these users B, C . . . are individually concentrated in playing games by themselves.

Moreover, the user can not necessarily recognize how other users are playing. Therefore, there have been cases where it is difficult to determine whether or not to register a user as a friend.

In this manner, with the technique of the conventional example, it has been difficult to recognize the situations of users who are using other information processing apparatuses. Thus, communication among users has been difficult in some cases.

The present invention has been made in view of the circumstances above. It is an object of the present invention to provide an information processing apparatus, a method of controlling the information processing apparatus, and a program that can assist communication among users.

Solution to Problem

According to one aspect of the present invention for solving the problem of the conventional example described above, an information processing apparatus that is communicably connected to a server via a network and acquires, from the server, pieces of provision information including pieces of information regarding game play in other information processing apparatuses includes processing means configured to operate in at least one mode among a game-play mode in which a user is allowed to play a game and a zoom-out mode in which the pieces of provision information acquired are presented, acquisition means configured to, in the zoom-out mode, acquire provision information regarding game play of another user selected on the basis of a predetermined selection condition among the pieces of provision information, and presentation means configured to, in the zoom-out mode, present the acquired provision information.

Advantageous Effect of Invention

According to the present invention, communication among users is assisted.

DESCRIPTION OF EMBODIMENT

Figure 1:
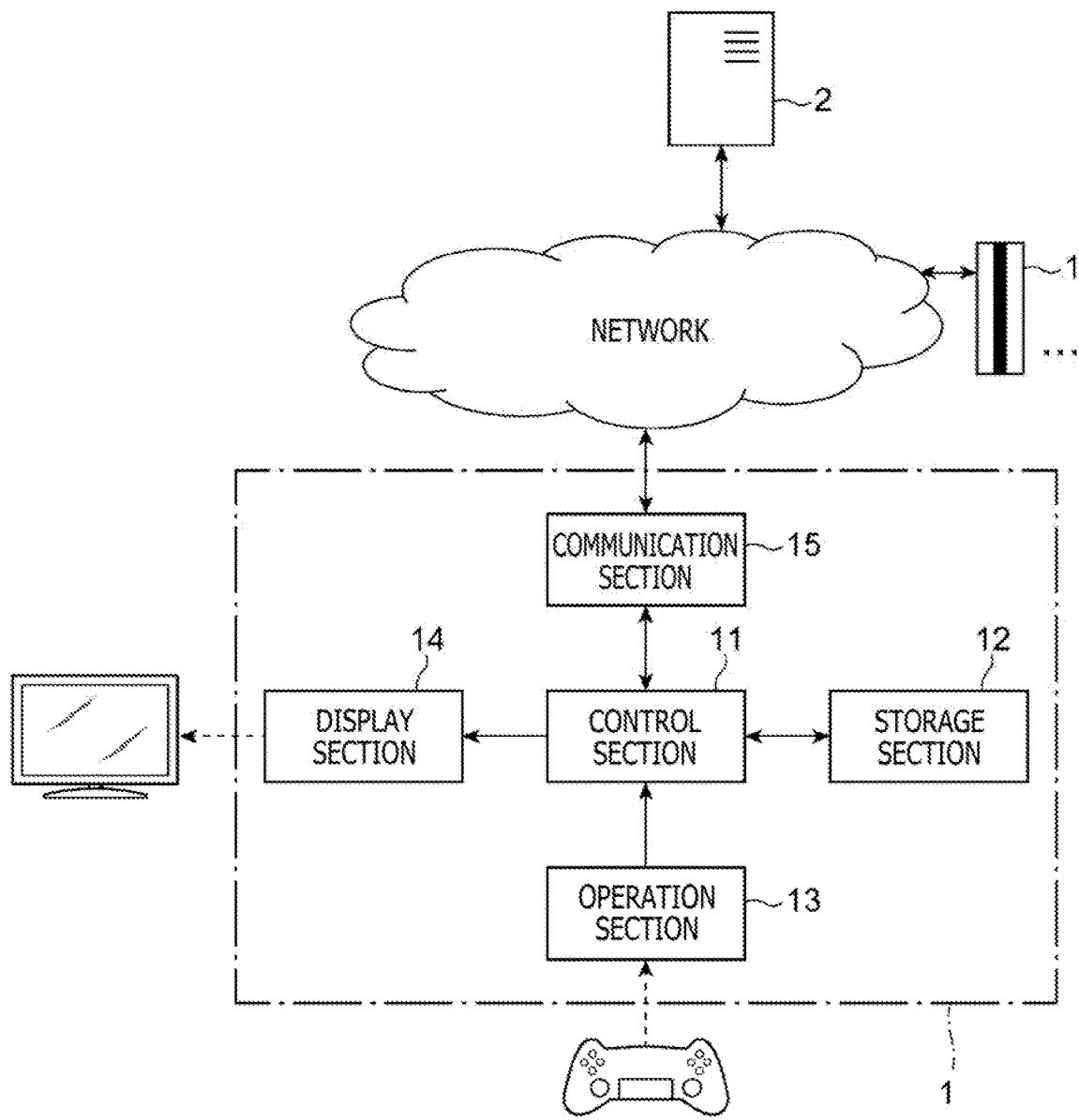
FIG. 1 is a block diagram illustrating an example of a configuration and connection of an information processing apparatus according to an embodiment of the present invention.

An information processing apparatus 1 according to an embodiment of the present invention is, for example, a home game machine and is communicably connected to a server 2 via a network, as exemplified in FIG. 1. Further, the server 2 is also connected to a plurality of information processing apparatuses 1 via the network.

As exemplified in FIG. 1, the information processing apparatus 1 is computer equipment including a control section 11, a storage section 12, an operation section 13, a display section 14, and a communication section 15. The control section 11 is a program control device such as a central processing unit (CPU) and operates according to a program stored in the storage section 12.

In the present embodiment, the control section 11 communicates with the server 2 to allow the user to play a game provided by the server 2. Further, the control section 11 receives information (an example of provision information) to be transmitted and received via the server 2, such as a message from the user, and transmits the message information and the like to the server 2.

The control section 11 operates in one of a plurality of modes including at least a game-play mode and a zoom-out mode. In the game-play mode, a game screen provided by the server 2 is displayed in full screen, and the user is allowed to play the game. In the zoom-out mode, various pieces of provision information, such as message information provided by another information processing apparatus 1, are presented. Here, in the zoom-out mode, among the pieces of provision information including pieces of information regarding game play, information regarding game play of another user selected on the basis of a predetermined condition is presented. This operation of the control section 11 will be described in detail later.

The storage section 12 is a memory device, a disk device, or the like, and retains the program that is executed by the control section 11. This program may be stored and provided in a computer-readable and non-transitory recording medium. Further, the storage section 12 also operates as a work memory for the control section 11.

The operation section 13 accepts a user's instruction operation input from a game controller or the like and outputs the instruction operation to the control section 11. According to the instruction input from the control section 11, the display section 14 outputs image data to a display or the like, causing the display or the like to display the image data.

The communication section 15 is a network interface or the like and transmits information to the server 2 or other information processing apparatuses 1 via the network according to an instruction input from the control section 11. Further, the communication section 15 also outputs information received from the server 2 or other information processing apparatuses 1 to the control section 11.

The server 2 is implemented using a general server computer. The server 2 is communicably connected to the plurality of information processing apparatuses 1 via the network. The server 2 authenticates users of the information processing apparatuses 1 and acquires information that identifies the user of each information processing apparatus 1. This user authentication processing can be implemented using a widely known authentication processing method, such as a method using usernames and passwords.

Further, after authenticating the user, the server 2 assumes that the user remains logged in, and continues game processing until the server 2 receives no operation information from the information processing apparatus 1 for more than a predetermined period of time (a login session duration time). Further, when the server 2 receives no operation information beyond the login session duration time, the server 2 assumes that the user has logged out and deletes (or does not retain) information such as a message that is retained in association with the information identifying this user, for example.

The server 2 according to the present embodiment executes a game service application that is played by the users of the plurality of information processing apparatuses 1. The server 2 retains individual information (per-user information) regarding each user who is playing the game provided as a service by the server 2 itself and game information shared among the users. The server 2 transmits, to the information processing apparatus 1 of each user, information regarding the game screen to be presented to the corresponding user.

Here, per-user information is retained in association with information identifying a corresponding user and includes information regarding the position and state of the user in the game (orientation, attack/defense state, and the like), in addition to information regarding the user's game progress state, information regarding the user's game achievement status, and the like. Among these pieces of information, the information representing the progress state is, for example, the user's "level" information (information that affects parameters such as attack power in a combat-type game or the like), stage information (information that identifies the stage the user is challenging in a game in which the user clears a plurality of stages), or the like.

Further, the information regarding the game achievement status is, for example, a list of pieces of information that identifies a goal that has been achieved among a plurality of goals predetermined in each game.

As a specific example of the present embodiment, in the description here, the server 2 is assumed to provide a service of a combat-type game in which a plurality of users can participate. However, this is merely an example, and a service such as a game provided by the server 2 is not limited to the combat-type game.

In this example here, the server 2 retains map information shared among the users and game information representing the position and state of an enemy character (including which direction the enemy character is facing, whether or not the enemy character is attacking, whether or not the enemy character is ready to act, and the like), and performs a process of moving the enemy character or updating its state. Further, the server 2 according to this example accepts, from the information processing apparatus 1 of each user, an instruction or the like to move the position of a game character controlled by the corresponding user or to carry out an attack by this character, and updates the per-user information and the game information according to the instruction. Then, on the basis of the per-user information and the game information, the server 2 performs processes of, for example, generating game screen information (image data) that each information processing apparatus 1 should present to the corresponding user and transmitting the game screen information to each corresponding information processing apparatus 1. Since a multiplayer game processing execution method performed by the server 2 described above is widely known, a more detailed description is omitted here.

Further, in the example of the present embodiment, the server 2 further accepts, from the information processing apparatus 1, information identifying another user (viewing target user) different from the user who is using the information processing apparatus 1 and a viewing request of the game screen provided to the user (viewing request target user) identified by this information, and distributes the game screen information provided to the viewing request target user to the information processing apparatus 1 that has transmitted the viewing request (game screen distribution).

The server 2 may accept a comment posted by a user (viewing user) who is receiving the game screen distribution in this manner and viewing the game screen of another user, and transmit the posted comment, as one piece of provision information, to the information processing apparatus 1 used by each of the viewing user and the viewing target user who are viewing the same game screen.

Figure 2:
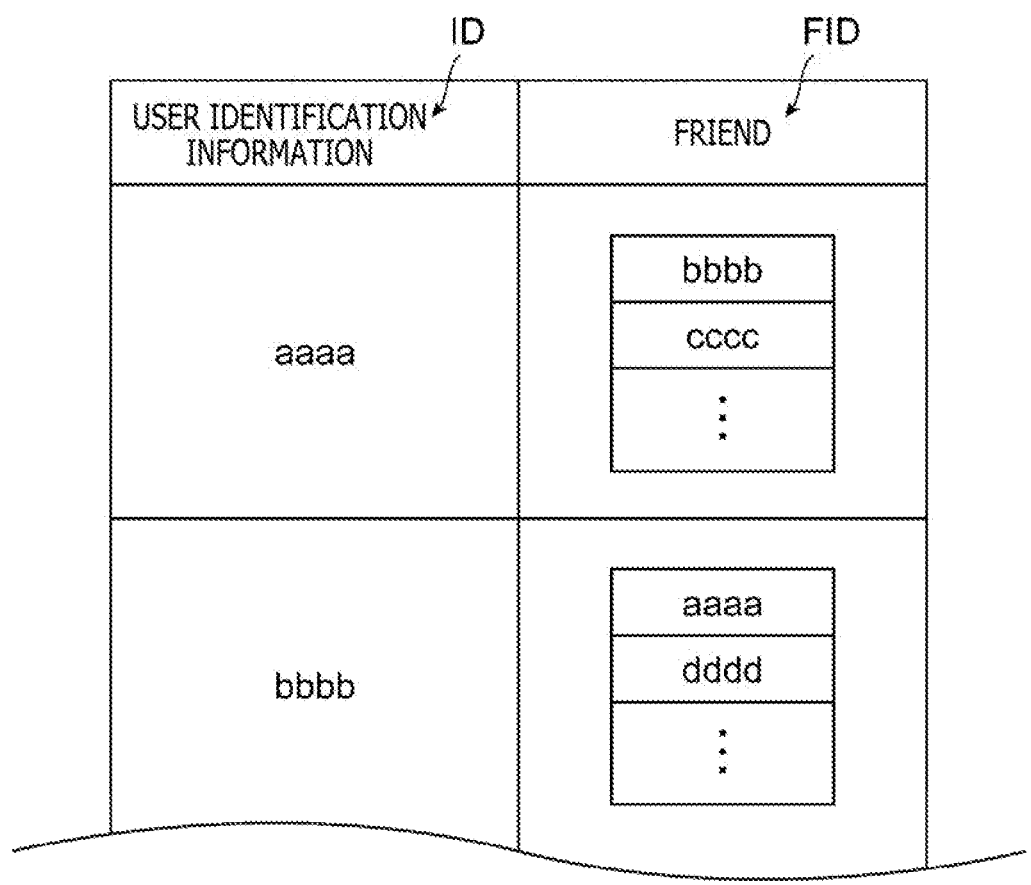
FIG. 2 is an explanatory diagram representing an example of a database retained by the information processing apparatus according to the embodiment of the present invention.

Further, the server 2 performs a process of, together with information identifying another user received from the user of the information processing apparatus 1, registering the user identified by this information as a "friend." Specifically, as exemplified in FIG. 2, the server 2 retains, as a friend database, user identification information (ID) that identifies a user in association with information (FID) that identifies another user registered by the user as a friend.

Moreover, when the server 2 receives predetermined provision information from the information processing apparatus 1, the server 2 acquires information identifying the user of the information processing apparatus 1 that has transmitted the provision information, and performs predetermined processing for each type of provision information. Here, the predetermined provision information may include, for example, message information input by the user of the information processing apparatus 1 that has transmitted this provision information. Moreover, this message information may include not only the destination of the message and character string information representing the content of the message, but also ancillary information such as information representing the importance of the message set by the user.

Further, the server 2 also performs various predetermined processes including a process of transmitting information to the information processing apparatus 1, for example, a process of distributing image data and the like of the game screen on which the user of the information processing apparatus 1 that is the transmission destination is playing.

In one example of the present embodiment, the server 2 accepts a request for provision information from any of the information processing apparatuses 1 (the information processing apparatus 1 that is the source of the request). In response, the server 2 transmits the requested provision information to the information processing apparatus 1 that is the source of this request. For example, when the server 2 receives, from a user, a message and information identifying the destination as pieces of provision information, the server 2 retains the received message and information identifying the destination in association with the information identifying this user. Then, when the server 2 receives a request for provision information from the information processing apparatus 1 of another user, the server 2 selects such a message that the user of the information processing apparatus 1 that is the source of the request of the provision information is included in the associated destination information from among the retained messages, and transmits the selected message to the information processing apparatus 1.

Here, the destination information may be user identification information itself, information indicating a friend, or information indicating a public message. In a case where the information indicating a friend serves as the destination, the server 2 transmits the message transmitted by a user (a transmitting user) who is the friend of the user of the information processing apparatus 1 that is the source of the request of the provision information (referred to as a requesting user for the sake of distinction) to the information processing apparatus 1 of the requesting user.

Further, when the information indicating a public message is set as the destination information, the message associated with this destination information may be treated as a message that can be transmitted to the information processing apparatuses 1 of all users (as a message addressed to all users).

Figure 3:
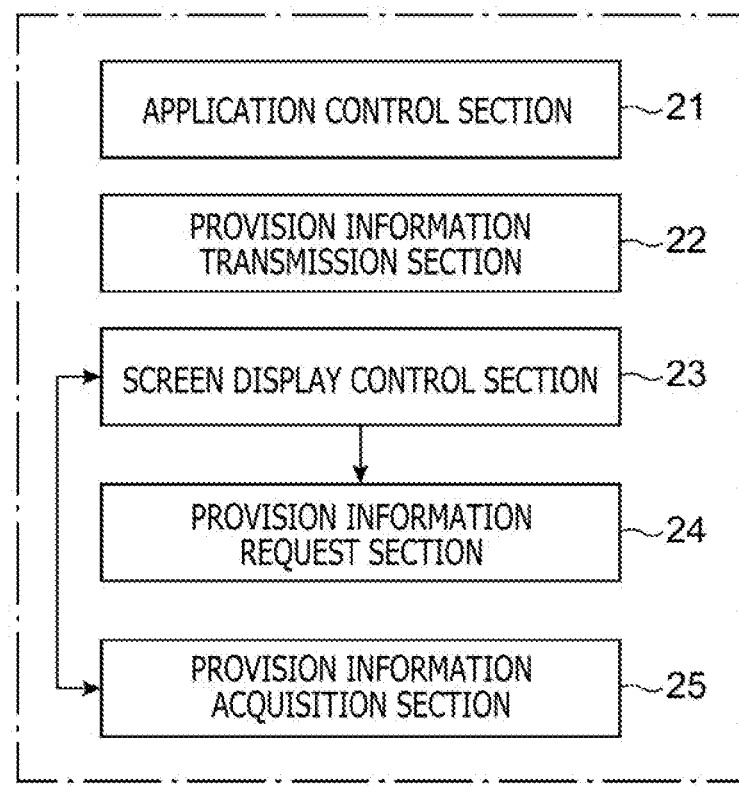
FIG. 3 is a functional block diagram representing an example of the information processing apparatus according to the embodiment of the present invention.

Next, the operation of the control section 11 of the information processing apparatus 1 will be described. As exemplified in FIG. 3, the control section 11 of the information processing apparatus 1 according to the embodiment of the present invention functionally includes an application control section 21, a provision information transmission section 22, a screen display control section 23, a provision information request section 24, and a provision information acquisition section 25.

The application control section 21 performs game application processing. In one example of the present embodiment, when activated, a game application executed by the application control section 21 transmits user authentication information to the server 2 and requests the server 2 to authenticate the user. After successful authentication, the application control section 21 accesses a game service provided by the server 2, and transmits the content of an instruction input by the user to the server 2. Further, the application control section 21 receives game screen information transmitted by the server 2 and displays and outputs the game screen information.

When the provision information transmission section 22 accepts an input of a message from the user, the provision information transmission section 22 transmits the input message to the server 2. It is noted that, in the example of the present embodiment, importance information can be set in the message. In this case, the importance information that has been set is transmitted to the server 2 together with the information representing the content of the message.

The screen display control section 23 controls content of the screen displayed by the information processing apparatus 1 according to the user's instruction. In one example of the present embodiment, as exemplified in FIG. 4, the information processing apparatus 1 controls the display of the screen by switching between the game-play mode (FIG. 4(a)) and the zoom-out mode (FIGS. 4(b) and 4(c)) according to the user's instruction. In the game-play mode, the game screen is displayed in full screen. In the zoom-out mode, pieces of provision information provided by other information processing apparatuses 1 are presented.

Further, when the user issues an instruction to set to the zoom-out mode, the screen display control section 23 outputs an instruction to cause the provision information request section 24 to make a request for pieces of provision information. The screen display control section 23 acquires, from the provision information acquisition section 25, the pieces of provision information transmitted by the server 2 in response to this request and displays the pieces of provision information outside the game screen (GS of FIGS. 4(b) and 4(c)). An example of the screen display performed by the screen display control section 23 will be described later.

The provision information request section 24 receives, from the screen display control section 23, an instruction to acquire pieces of provision information. According to this instruction, the provision information request section 24 requests, from the server 2, pieces of provision information provided by the users of other information processing apparatuses 1. In one example of the present embodiment, the provision information request section 24 transmits, to the server 2, a condition (selection condition) pertaining to the pieces of provision information requested.

This selection condition is a condition pertaining to the selection of provision information. For example, the selection condition is such a condition as how many pieces of provision information of users who are friends are to be acquired (how many users the pieces of provision information are to be acquired from) or a condition pertaining to the user's own game progress state (e.g., a condition under which provision information of any user who is challenging the stage the user is challenging or has completed is to be selected).

In the present embodiment, the selection condition transmitted by the provision information request section 24 is preliminarily set by the user (the information processing apparatus 1 only needs to preliminarily accept, from the user, settings such as how many game screens of friends are to be acquired, stages that have not been completed are not to be viewed, or the like). Further, in one example of the present embodiment, the provision information request section 24 may request, from the server 2, pieces of provision information under a plurality of mutually different selection conditions.

The provision information acquisition section 25 receives pieces of provision information transmitted by the server 2 in response to the request transmitted by the provision information request section 24 and outputs the pieces of provision information to the screen display control section 23.

In one example of the present embodiment, as described above, the information processing apparatus 1 specifies the selection condition upon requesting, from the server 2, pieces of provision information provided by the users of other information processing apparatuses 1. Thus, the server 2 selects and transmits pieces of provision information in the following manner.

As already described, the server 2 receives a message from the information processing apparatus 1 connected via the network and retains the messages in association with information identifying the user of the information processing apparatus 1. Further, the server 2 retains game screen information to be transmitted to the information processing apparatus 1. In addition, the server 2 retains, as per-user information, information regarding the user's game progress state and the like in association with the information identifying this user. Moreover, the server 2 retains the friend database in which information identifying a user is associated with information identifying another user who is registered as a friend of the user identified by this information.

For example, when the server 2 accepts a condition requesting acquisition of game screens of two users registered as friends as the selection condition and a request for pieces of provision information, together with the information identifying the user, the server 2 refers to the friend database in response to the request and acquires a list of friends of the user identified by the received information. Then, the server 2 selects any user who is currently logged in from among the users identified by pieces of information included in the acquired list. In a case where two or more users match the condition, the server 2 may randomly select two users. The server 2 acquires pieces of game screen information of the two users selected or extracted here, and transmits, as the pieces of provision information provided by those other information processing apparatuses 1, the pieces of game screen information acquired to the information processing apparatus 1 that has requested the pieces of provision information. At this time, the server 2 may also transmit, in association with each game screen information, information identifying the user (which only needs to be a registered name or the like of the user, for example) associated with the corresponding game screen, information representing the corresponding user's game progress state, and the like (as the pieces of provision information provided by those other information processing apparatuses 1). Further, in a case where a character controlled by one user associated with the game screen is "dead" in the game, the server 2 may also transmit information representing this state (information representing the state of the character) (as provision information provided by the other information processing apparatus 1). Moreover, the server 2 may also transmit information representing the last message transmitted by this user and importance information of this message as one piece of provision information provided by the other information processing apparatus 1.

Next, an example of the screen display performed by the screen display control section 23 of the information processing apparatus 1 will be described. In a normal state in which the user is playing a game, the information processing apparatus 1 according to the present embodiment displays the game screen in the game-play mode (FIG. 4(a)). As exemplified in FIG. 4(a), in the game-play mode, the information processing apparatus 1 displays the game screen in full screen. In this state, the information processing apparatus 1 receives the game screen information of the user of the information processing apparatus 1 from the server 2 and displays the received game screen information as it is.

Further, when the server 2 needs to notify the information processing apparatus 1 that, for example, there is, in particular, a message addressed to the user of the information processing apparatus 1, in addition to the game screen information, the server 2 transmits information representing the presence of the notification to the information processing apparatus 1.

When the information processing apparatus 1 receives this information representing the presence of the notification during display in the game-play mode, the information processing apparatus 1 may display an icon (N) so as to be superimposed on the game screen (FIG. 4(a)). The icon (N) indicates that there is a notification from the server 2.

When the information processing apparatus 1 has received an instruction from the user to switch the display, the information processing apparatus 1 switches the display content to the display in the zoom-out mode in which pieces of provision information provided by other information processing apparatuses 1 are presented. When the information processing apparatus 1 performs display in the zoom-out mode, the information processing apparatus 1 initially includes and displays the entire game screen (GS) of the user of the information processing apparatus 1, which is transmitted from the server 2 to the information processing apparatus 1, as part of the screen. Further, during the display in the zoom-out mode, the information processing apparatus 1 displays a list of viewing users (W) who are viewing the game screen of this user along with the display of the game screen (GS) (in a case where there are many users, the information processing apparatus 1 may randomly select part of these users, i.e., a predetermined number of users or select a predetermined number of users in order of users with the most comments posted or in order of users with the most recent comments). Further, when any of the users included in the list posts a comment, the information processing apparatus 1 displays the content of the comment (e.g., in the form of a speech bubble). It is noted that the example of FIG. 4(b) represents an example in which a list of viewing users is displayed as a list of icons of the viewing users, and moreover, each icon is displayed at an edge of the screen such that part of the icon sticks out (part of the icon is not displayed). It is noted that in this example, the server 2 accepts the registration of an icon of each user in advance and retains each icon in association with the information identifying the corresponding user. Upon display of the list or the like, the server 2 transmits each icon information, which is retained in association with the information identifying the corresponding user and is to be displayed as the list, to the information processing apparatus 1.

Moreover, the information processing apparatus 1 may not only display a speech bubble as described above for a user displaying a comment but also control the icon such that the icon is moved toward the center of the screen and the whole icon is displayed (FIG. 4(b), W).

Then, while displaying the screen in the zoom-out mode, the information processing apparatus 1 may request the game screens of other users from the server 2 and display the game screens of these users (FS, OS) received from the server 2 in response to the request. Of these, first, the example of FIG. 4(b) represents an example in which the game screens of two friends (FS) are displayed adjacent to the user's own game screen (GS).

Moreover, while displaying the screen in the zoom-out mode, the information processing apparatus 1 may request the server 2 to provide a message addressed to the user, and when the server 2 transmits message information in response to the request, the information processing apparatus 1 may receive this information and display the message (M) on the screen.

Figure 4:
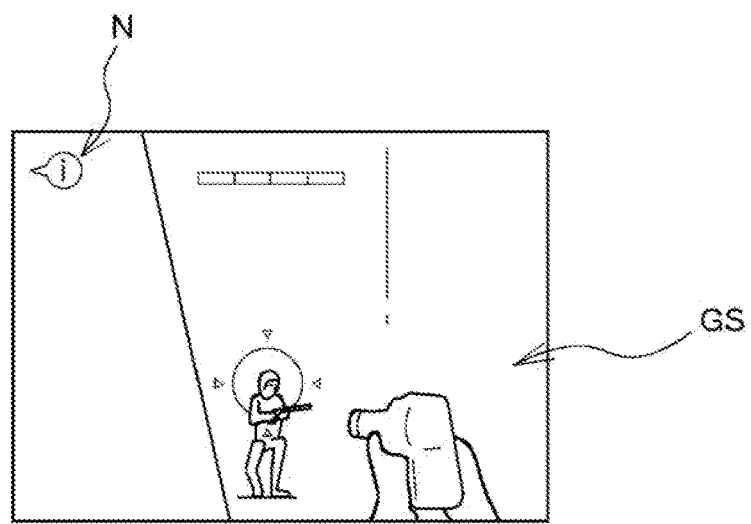
FIG. 4 depicts explanatory diagrams representing examples of screen display of the information processing apparatus according to the embodiment of the present invention.
Figure 4:
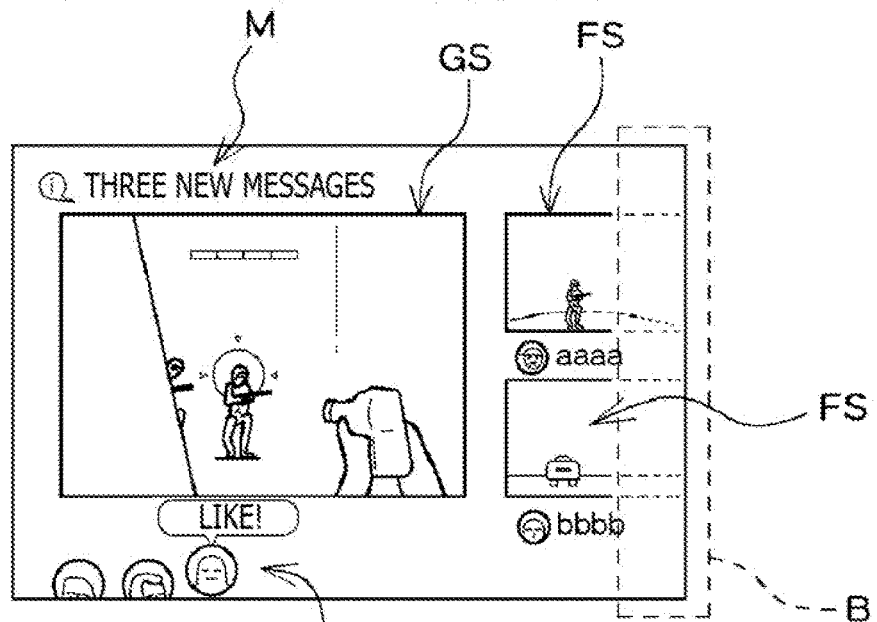
Figure 4:
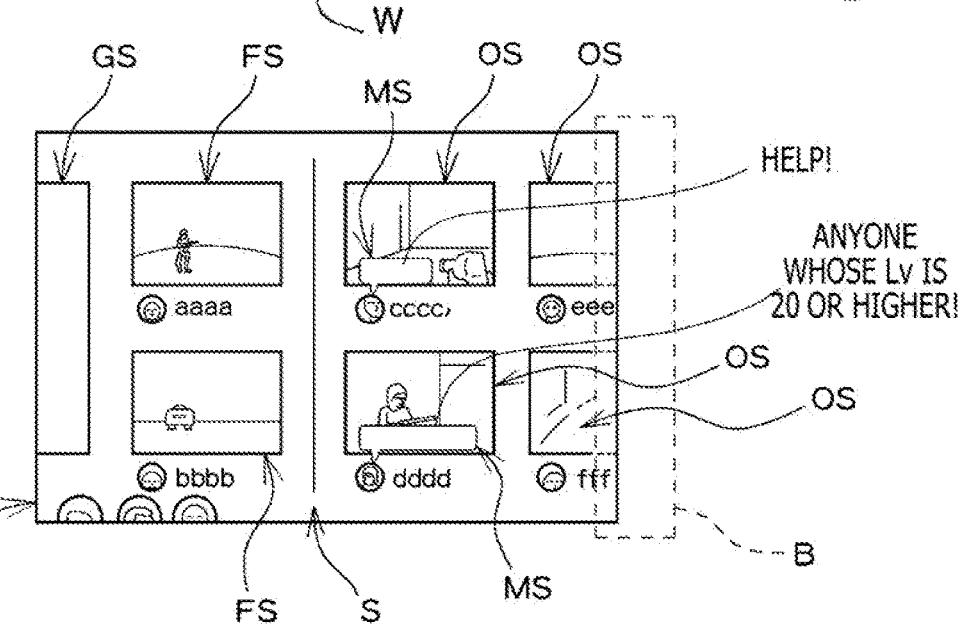

Further, in the example here, the information processing apparatus 1 applies predetermined image processing to an edge of the screen (the right edge in the example of FIG. 4(*b*)) (B) to indicate that performing scrolling operation can display information that is not displayed at this point. The example of FIG. 4(*b*) represents an example with blur processing. However, this processing is not limited to blurring. This processing may be a process of forming blur using a Gaussian filter or the like, or may be a process of changing the brightness or the like.

When the user performs a scrolling operation (an operation of scrolling to the right in the example of the figure) while the information processing apparatus 1 is performing the display in the zoom-out mode exemplified in FIG. 4(*b*), the information processing apparatus 1 may further display game screens of other users (FIG. 4(*c*)). The example of FIG. 4(*c*) represents a state in which a plurality of game screens (OS) of users who are not friends are displayed in addition to the game screens (FS) of the two friends displayed in FIG. 4(*b*).

In order to perform this display, the information processing apparatus 1 requests the server 2 to acquire, in addition to the pieces of screen information of the two friends, pieces of provision information including the game screens and the like of users who are not friends by specifying non-friend users as a selection condition. Then, the information processing apparatus 1 aligns and displays the game screens (FS) of the friends and the game screens (OS) of the other users transmitted by the server 2 in response to this request. It is noted that the information processing apparatus 1 displays the game screens of the friends and the game screens of the non-friend users in a mutually distinguishable mode. In the example of FIG. 4(*c*), the area of the screen is divided by a separator (S). The pieces of information (the game screens here) regarding the game play of other users selected on the basis of a selection condition that selects users who are friends (a first selection condition) are aligned and displayed in one of the divided areas (corresponding to a first information presentation area), while the pieces of information regarding the game play of other users selected on the basis of a selection condition that selects non-friends (a second selection condition) are aligned and displayed in an area (a second information presentation area) different from the area corresponding to the first information presentation area described above.

In this manner, in the present embodiment, the information processing apparatus 1 presents pieces of information regarding game play of other users selected on the basis of mutually different selection conditions in a mutually distinguishable mode. For example, the information processing apparatus 1 divides the area to be displayed and displays these pieces of information in their respective corresponding areas, as in this example.

Further, as illustrated in FIGS. 4(*b*) and 4(*c*), the information processing apparatus 1 may display the information regarding the game play (here, the game screen) of each of these other users, together with icon information and the like retained in the server 2 in association with the information identifying the corresponding user (hereinafter referred to as a user in presentation for the sake of distinction). Moreover, when any of the users in presentation provides a message addressed to the user of the information processing apparatus 1 (including a message addressed to all users or a message addressed to friends if the user in presentation is a friend), the server 2 transmits this message to the information processing apparatus 1. The information processing apparatus 1 may display the message (MS) in the vicinity of the corresponding user's icon or the like with a speech bubble as exemplified in FIG. 4(*c*), for example.

[Suspension of Game] It is noted that when the information processing apparatus 1 performs display in a mode other than the game-play mode as described above, the information processing apparatus 1 may suspend the game processing (may not communicate the content of the user operation to the server 2). In this case, the content of the game being executed by the server 2 may move forward.

[Server's Selection of Provision Information] Further, in the description of the present embodiment so far, the server 2 selects users whose pieces of provision information are to be provided on the basis of a selection condition received from the information processing apparatus 1. However, the present embodiment is not limited to this example.

For example, in a case where the number of users who are selected on the basis of the selection condition received from the information processing apparatus 1 is large (in a case where the number of users selected exceeds a predetermined threshold), the server 2 further narrows down users whose pieces of provision information are to be provided, from among the users selected on the basis of the selection condition received from the information processing apparatus 1. This narrowing down is, for example, performed in the following manner.

That is, the server 2 may randomly select a predetermined number of users from among the users selected on the basis of the selection condition received from the information processing apparatus 1. Further, the server 2 may select users who provide messages set as having high importance, from among the users selected on the basis of the selection condition received from the information processing apparatus 1 (and may further randomly narrow down users from among those selected).

Further, the server 2 may also refer to information regarding the game progress state (level information) of the user of the information processing apparatus 1 that has transmitted the selection condition, and narrow down users as described above on the basis of the level information. For example, the server 2 may narrow users down to users whose level representing the game progress state is the same as the above-described referenced level or whose level is equal to or less than the above-described referenced level information.

Moreover, the server 2 may perform narrowing down on the basis of the content of messages transmitted by users. Specifically, in a case where a message transmitted by a user includes any description regarding the level, that is, when the message includes a character string (a regular expression character string) that is "level X" (X is assumed to match any numerical value), the server 2 compares the level x represented by the character string with information regarding the game progress state (level information y) of the user of the information processing apparatus 1 that has transmitted the selection condition. Then, when $y>x$, the server 2 includes the user who has transmitted this message in the targets to be narrowed down (when $y<x$, the server 2 excludes this user from the targets to be narrowed down).

With this configuration, the game screen of a user who has transmitted, for example, a message such as "looking for users of level 20 or higher!" is not provided to the information processing apparatus 1 of any user whose level is lower than level 20. Thus, provision information such as a message is presented to appropriate users.

Further, the server 2 may perform narrowing down according to an instruction from the game application that is running. For example, the server 2 may include, in the targets to be narrowed down, any user whose physical strength information of a character operated in the game is below a predetermined threshold. Accordingly, when the character or a party in which this character participates is in a critical situation in the game, the game screen of the user who is operating this character is preferentially provided to the information processing apparatuses 1 of other users, and this user can expect assistance or the like.

[Restrictions Imposed by Provider of Provision Information] Further, the server 2 may also preliminarily accept, from users, information (restrictive information) that restricts the destination to which provision information is to be provided, and perform narrowing down described above on the basis of the restrictive information. In the present embodiment, this restrictive information may be, for example, information representing a condition restricting the destination to friends or information representing a condition pertaining to the level.

As for any user for which the restrictive information is set among the users selected by the selection condition received from the information processing apparatus 1, when the condition represented by the restrictive information is satisfied, the server 2 includes this user in the targets to be narrowed down. Specifically, as for any user for which the restrictive information restricting the destination to friends is set, the server 2 excludes such a user from the targets to be narrowed down in a case where the user of the information processing apparatus 1 that is the transmitter of the selection condition is not a friend. It is preferable that users can specify this restrictive information at any timing.

[In Case Where Server is Serving Plurality of Games] Moreover, in one example of the present embodiment, the server 2 may provide services of a plurality of types of games. In this case, the above-described narrowing-down condition may narrow users down to users who are playing the same type of game as that of the game being played by the user of the information processing apparatus 1 that is the transmitter of the selection condition. Further, the server 2 may narrow users down to users who are playing a different type of game from that of the game being played by the user of the information processing apparatus 1 that is the transmitter of the selection condition.

[Frame Dropping Display] Moreover, in the present embodiment, the game screen information provided from the server 2 to the information processing apparatus 1 as provision information does not necessarily have to be a moving image (images of a plurality of frames per second). For example, the server 2 may extract and provide an image of one frame every 30 seconds. With this configuration, the load on the network can be reduced.

[Another Example of User State Display] Moreover, in the example of the present embodiment, while the information processing apparatus 1 performs display in the zoom-out mode, the information processing apparatus 1 displays icons of viewing users and users (presenting users) whose game images and the like are being displayed, usernames of these users, and the like (such as W and FS of FIG. 4(*b*)).

The display related to the states of the viewing users and the presenting users (hereinafter collectively referred to as display target users) may be further performed as follows. That is, in the present embodiment, the information processing apparatus 1 acquires various pieces of information regarding the display target users from the server 2, and displays images representing these pieces of information in the vicinity of the icons of the respective corresponding display target users.

Figure 5:
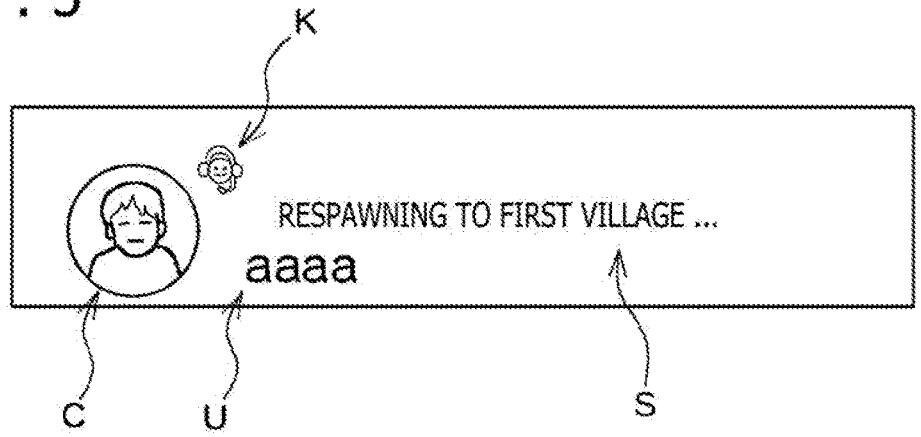
FIG. 5 is an explanatory diagram representing an example of a state of a user displayed by the information processing apparatus according to the embodiment of the present invention.

As an example, in the present embodiment, as exemplified in FIG. 5, a rectangular area including an icon of a display target user may be predetermined, and the information processing apparatus 1 may perform control such that information regarding this display target user is displayed only within this area.

Here, as already described, information regarding a display target user provided by the server 2 includes information regarding a character (S) controlled by this display target user in the game, in addition to an icon (C), a username (U), and the like. For example, the server 2 provides information indicating that this character is "moving," "under attack," "dead," "respawned," or the like in the game and the location of the character in the game space (whether or not the character is in a safe zone, a battlefield, or the like). Further, when the display target user has achieved some kind of goal in the game, the server 2 may also transmit information representing the achievement of the goal as provision information.

Then, the information processing apparatus 1 receives these pieces of information provided. For example, for a display target user whose controlled character has been "dead," the information processing apparatus 1 may change an icon of this display target user into a monotone and display the monotone icon along with a character string indicating that the character has died in the game. Alternatively, the information processing apparatus 1 may blink the icon.

Further, when the physical strength of this controlled character in the game (the character is assumed to die when its physical strength becomes "0") falls below a predetermined threshold, the information processing apparatus 1 may perform a process of, for example, displaying a yellow frame around the above-described rectangular area in the vicinity of the icon of the display target user who is controlling this character.

Moreover, as for a display target user who has achieved a goal in the game, the information processing apparatus 1 may receive, from the server 2, information representing that this display target user has achieved some kind of goal and display an image of a trophy in the vicinity of an icon of this display target user.

Further, in one example of the present embodiment, the information processing apparatus 1 may display information as a message from a display target user on the basis of information received from the server 2. For example, in a case where the message includes a predetermined character string such as "help me," the information processing apparatus 1 may display a predetermined image associated with the character string, for example, an image of a flag, in the vicinity of an icon of this display target user.

[User Action] Moreover, provision information regarding a user, which is provided by the server 2, is not limited to information provided by the user, and may be information based on the user's action. For example, the user of the information processing apparatus 1 may be able to carry out an action of capturing a screenshot of the game screen or an action of setting to share the screenshot. In this case, the server 2 acquires the image of the screenshot that has been captured or to be shared as provision information and provides the image to other users.

In this case as well, when a display target user being displayed on the screen captures a screenshot, the information processing apparatus 1 may receive an image of the captured screenshot via the server 2 and display the image in the vicinity of an icon of this display target user.

[Chat] Further, the server 2 may also provide a service that allows chatting between users playing the game. In this chat service, for example, the user operating the information processing apparatus 1 gives an instruction to open a chat, causing the server 2 to open a virtual space (a chat room) in which information regarding the chat is temporarily accumulated.

When the server 2 opens a chat room, the server 2 issues identification information unique to this chat room. After that, the server 2 accepts requests for participation in this chat room from a plurality of information processing apparatuses 1 and retains the identification information of the chat room in association with information identifying the user of each information processing apparatus 1 that has requested participation.

After that, the information processing apparatus 1 used by the user participating in the chat room acquires a voice signal of the user via a microphone (not illustrated) connected to the information processing apparatus 1, converts the voice signal into digital voice data, and transmits the voice data to the server 2. Further, the information processing apparatus 1 receives, from the server 2, voice data accumulated in the chat room in which the user is participating, and outputs the voice based on the received voice data.

When the server 2 receives voice data from the information processing apparatus 1, the server 2 accumulates the voice data in the chat room in which the user of the information processing apparatus 1 from which the server 2 has received this voice data is participating (the chat room is identified by information associated with user identification information that identifies this user). Then, the server 2 transmits this voice data to the information processing apparatus 1 of each user participating in this chat room.

Since such chat-related processing can employ a widely known method, detailed description other than the example above is omitted.

In the present embodiment, the server 2 acquires character string information on the basis of the voice data accumulated in the chat room. This processing can also employ a widely known method as voice recognition processing.

Then, the server 2 transmits, as provision information of each user participating in this chat room, the character string information acquired on the basis of this voice data to any information processing apparatus 1 that requests provision information. It is noted that the server 2 may include, in this provision information, information identifying the user (corresponding user information) of the information processing apparatus 1 that has transmitted the voice data that is the source of the character string information.

In this example, in a case where the server 2 transmits provision information regarding a user participating in the chat room to the information processing apparatus 1, the server 2 may also transmit character string information based on voice data accumulated in the chat room in which this user is participating (and its corresponding user information), in addition to information received from the information processing apparatus 1 of this user and game screen information.

When the information processing apparatus 1 receives this character string information and the corresponding user information that identifies the user associated with this character string information, the information processing apparatus 1 performs display indicating the chat (e.g., display (K) of an image of a person wearing a headset as illustrated in FIG. 5) in the vicinity of the icon of the display target user while displaying the received character string information (even if the display target user does not correspond to the corresponding user information). This makes it possible to grasp the situation of the chat.

It is noted that in a case where chatting is performed by directly inputting a character string instead of voice data, the above-described processing may be performed using the input character string as it is (instead of the voice recognition result).

[Display of Friend List] Further, in the description so far, an example of performing display related to states of users along with image data of game screens has been described. However, the present embodiment is not limited to this example. For example, in response to receiving an instruction to display a friend list, the information processing apparatus 1 transmits the information identifying the user of the information processing apparatus 1 and a request for the friend list to the server 2.

In response to this request, the server 2 acquires a list of pieces of information identifying users stored in the friend database in association with the user identification information received together with this request, and transmits the list to the information processing apparatus 1 that is the source of the request. The information processing apparatus 1 that has received this list displays the friend list as follows.

In this example of the present embodiment, after the server 2 transmits this list, as with the example above, the server 2 acquires information regarding the state of each user identified by the information included in this list, information regarding the action of each user, and the like (the information regarding the state, action, and the like of each user will be hereinafter referred to as user state information) as one piece of provision information of each of other information processing apparatuses 1 and transmits these pieces of information to the information processing apparatus 1 that is the destination of the list.

Figure 6:
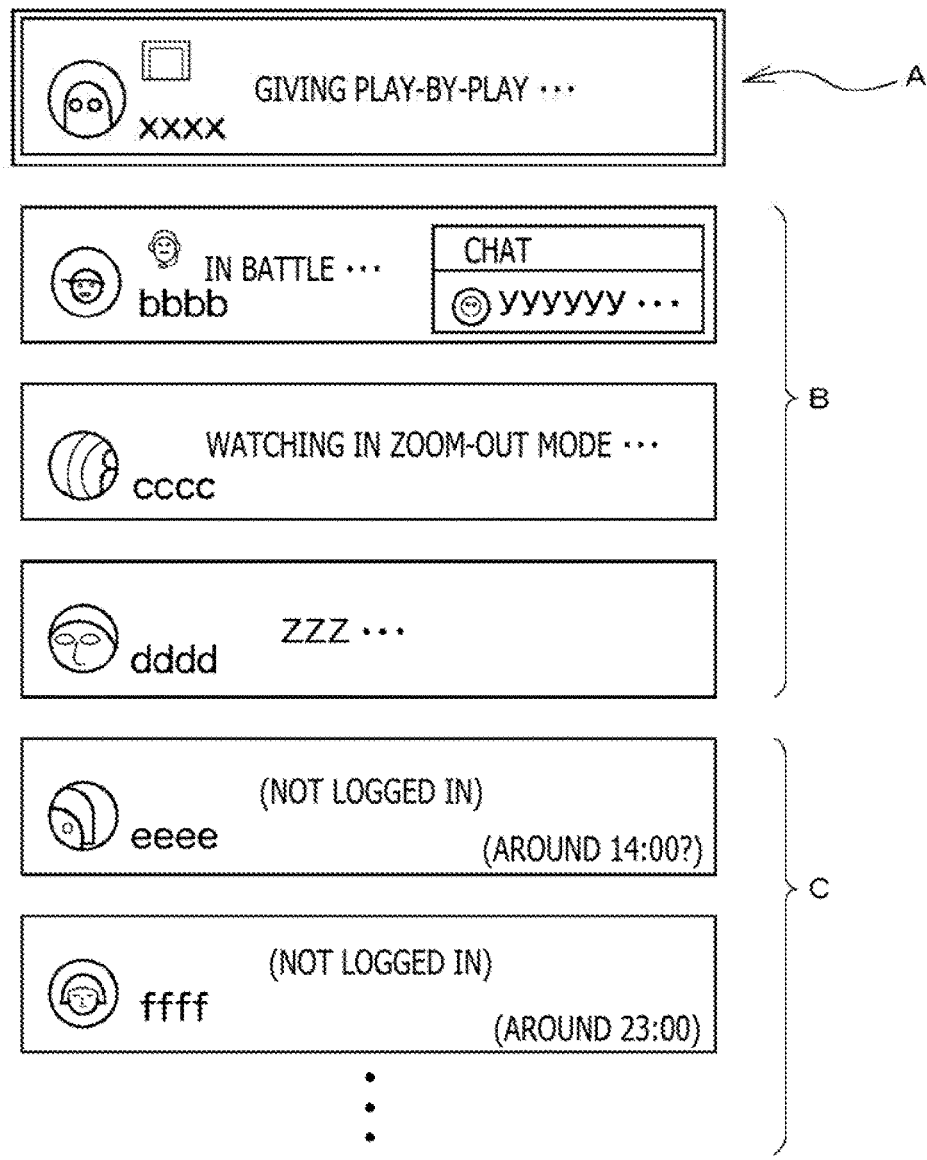
FIG. 6 is an explanatory diagram representing an example of a friend list displayed by the information processing apparatus according to the embodiment of the present invention.

As exemplified in FIG. 6, for example, the information processing apparatus 1 displays a column for displaying information regarding a user (A) who is providing the game screen as provision information (including an icon of this user; hereinafter the same) in an identifiable mode, while aligning columns (B) and columns (C). The columns (B) display pieces of information regarding friends (users) who are logged in, in the order in which the users are logged in to the server 2. The columns (C) display pieces of information regarding friends (users) who are not currently logged in.

Then, the information processing apparatus 1 receives the user state information of each user (display target user) included in the list from the server 2 as one piece of provision information of each of other information processing apparatuses 1. In response, as with the case where information is displayed together with the game screen, the information processing apparatus 1 performs display based on each user state information. In this case, in each corresponding column in which the information regarding each display target user associated with the corresponding user state information is displayed, the information processing apparatus 1 displays the corresponding information or changes the display mode of the information regarding the display target user associated with this information.

For example, this user state information includes information representing the in-game state of a character controlled by the corresponding display target user in the game. Moreover, in one example of the present embodiment, when the server 2 provides such information that the character controlled by the user is "dead" in the game or information regarding the location in the game space, the information processing apparatus 1 performs display such that, for example, an icon of this display target user is converted into a monotone or blinked, together with the display of a character string representing the in-game state of the character. Further, in a case where a display target user has achieved some kind of goal in the game and the server 2 transmits information representing the achievement of the goal as provision information, the information processing apparatus 1 performs a process of, for example, performing display such that the image of the trophy is included in the column in which the information regarding this display target user is displayed.

Further, in this example of the present embodiment, such information is also displayed in the case of friends who are not logged in (FIG. 6(c)). The server 2 may provide the following information regarding such friends.

That is, for each user, the server 2 generates a histogram of the time slot in which the user was logged in during a past predetermined period (e.g., the last one month). The server 2 then estimates that in the histogram, any time slot that exceeds a predetermined threshold is the time slot (estimated login time slot) in which the user is likely to log in.

In this manner, the server 2 acquires information regarding the estimated login time slot for each user and provides the above list to the information processing apparatus 1. As for any user who is not logged in at that time, the server 2 transmits information representing the most recent estimated login time slot to the information processing apparatus 1 to which the list is provided.

Then, the information processing apparatus 1 displays the information regarding the estimated login time slot of any user who is not logged in in the column in which the information regarding the corresponding user is displayed. This makes it possible to recognize the time slot in which the friend is likely to log in, thereby gaining the opportunity for cooperative play.

It is noted that the display of these pieces of information is not limited to the case of the list display. Whenever an icon of another user is displayed, even in the zoom-out mode (or even in the game-play mode), the information processing apparatus 1 repeatedly requests and acquires another user state information being displayed every predetermined timing (e.g., periodically), and may change the display or change the display mode on the basis of the acquired information. Specifically, the information processing apparatus 1 may change the display mode such that the display of the icon of the corresponding user is converted into a monotone or blinked on the basis of the user state information.

[Display of Excitement] Further, in the description so far, as for each display target user who is displayed on the information processing apparatus 1, the server 2 provides and allows display of information regarding, for example, the content of a message, the content of a chat, or the like. However, the present embodiment is not limited thereto. For example, after transmitting a character string of a chat, the server 2 may provide the information processing apparatus 1 with information indicating that the character string has been transmitted (information that does not include the content).

In this example, in response to receiving this information, the information processing apparatus 1 may, for example, display only an icon of a speech bubble. Moreover, the server 2 may provide information regarding the frequency of game operation of each display target user. Then, according to this operation frequency, the information processing apparatus 1 may perform a process of, for example, changing the color of the perimeter line of the column in which the information regarding the corresponding display target user is displayed.

With this configuration, excitement such as how much each user, such as a friend, is performing operation related to the game and how frequently each user is having a chat or the like can be visualized for the user of the information processing apparatus 1. The user of the information processing apparatus 1 can refer to this visualized information to select the timing of transmitting a message to a friend or the like or select a user to ask to join the game.

In this manner, according to the present embodiment, when a friend list or a list of game screens is displayed, pieces of information regarding states of users and pieces of status information that have a live feel can be acquired. Thus, communication among the users can be assisted.

[Game Screen Information] Further, in the description so far, the server 2 generates game screen information and provides the game screen information to each information processing apparatus 1. However, this processing method is also not limited to this example here. The server 2 may transmit information necessary to generate the game screen (information regarding a three-dimensional shape of a game field and game parameter information such as the location of an enemy character) to the information processing apparatuses 1, and cause the information processing apparatuses 1 to generate and display the game screen information.

In this case, when the server 2 provides the game screen, the server 2 acquires game screen information generated by each information processing apparatus 1 therefrom.

REFERENCE SIGNS LIST

1 Information processing apparatus, 2 Server, 11 Control section, 12 Storage section, 13 Operation section, 14 Display section, 15 Communication section, 21 Application control section, 22 Provision information transmission section, 23 Screen display control section, 24 Provision information request section, 25 Provision information acquisition section

The invention claimed is:

1. An information processing apparatus that is communicably connected to a server via a network and acquires, from the server, pieces of provision information including pieces of information regarding game play of other users in other information processing apparatuses, the information processing apparatus comprising:
a processing circuit configured to operate in at least one mode among a game-play mode in which a user is allowed to play a game and a zoom-out mode in which the pieces of provision information acquired are presented;
an acquisition circuit configured to, in the zoom-out mode, acquire provision information regarding game play of another user selected on a basis of a predetermined selection condition among the pieces of provision information; and
a presentation circuit configured to, in the zoom-out mode, present the acquired provision information, wherein:
in the game-play mode, the user is presented with a full size game screen having a full sized periphery defining a full size square area of a game field containing one or more full sized objects for engaging in gameplay, upon instruction by the user, the processing circuit switches to the zoom-out mode, in which the game screen is reduced from the full size to a reduced size game screen having a smaller periphery defining a smaller square area containing smaller versions of the one or more full sized objects, and the reduced game screen is presented to the user with some of the provision information simultaneously located outside the smaller periphery of the reduced game screen, and, and the presentation circuit is operable to permit the user to scroll past the reduced game screen to view more of the provision information.

2. The information processing apparatus according to claim 1, wherein
the selection condition includes a first selection condition and a second selection condition different from the first selection condition, and
the presentation circuit presents information by displaying an image including
a first information presentation area in which information regarding game play of another user selected on a basis of the first selection condition is presented, and
a second information presentation area in which information regarding game play of another user selected on a basis of the second selection condition is presented.

3. The information processing apparatus according to claim 1, wherein the selection condition that selects information regarding the game play of the another user includes a condition pertaining to information representing a game progress.

4. The information processing apparatus according to claim 1, wherein,
as the provision information regarding the game play of the another user selected on the basis of the predetermined selection condition, the acquisition circuit acquires information regarding a state of the another user, and
when the acquired provision information is presented, an icon of the another user associated with the provision information that is presented is displayed, and a display mode of the icon is changed and presented on a basis of the acquired information regarding the state of the another user.

5. The information processing apparatus according to claim 4, wherein
the information regarding the state of the another user includes information regarding an in-game state of a character controlled by the another user, and
when the icon of the another user is displayed on a basis of the information regarding the state of the another user, the display mode of the icon of the another user is changed and presented on a basis of the information regarding the in-game state of the character controlled by the another user.

6. The information processing apparatus according to claim 1, wherein the processing circuit is operable to permit the user to scroll past the reduced game screen to an extent sufficient to substantially remove the reduced game screen from the user's view.

7. A method of controlling an information processing apparatus that is communicably connected to a server via a network and acquires, from the server, pieces of provision information including pieces of information regarding game play of other users in other information processing apparatuses, the method comprising:

by using the information processing apparatus, operating in at least one mode among a game-play mode in which a user is allowed to play a game and a zoom-out mode in which the pieces of provision information acquired are presented;

in the zoom-out mode, acquiring, by an acquisition circuit, provision information regarding game play of another user selected on a basis of a predetermined selection condition among the pieces of provision information; and in the zoom-out mode, presenting, by a presentation circuit, the acquired provision information, wherein:

in the game-play mode, the user is presented with a full size game screen having a full sized periphery defining a full size square area of a game field containing one or more full sized objects for engaging in gameplay, upon instruction by the user, the processing circuit switches to the zoom-out mode, in which the game screen is reduced from the full size to a reduced size game screen having a smaller periphery defining a smaller square area containing smaller versions of the one or more full sized objects, and the reduced game screen is presented to the user with some of the provision information simultaneously located outside the smaller periphery of the reduced game screen, and, and the presentation circuit is operable to permit the user to scroll past the reduced game screen to view more of the provision information.

8. A non-transitory, computer readable storage medium containing a computer program for causing an information processing apparatus that is communicably connected to a server via a network and acquires, from the server, pieces of provision information including pieces of information regarding game play of other users in other information processing apparatuses, to carry out actions, comprising:

operating in at least one mode among a game-play mode in which a user is allowed to play a game and a zoom-out mode in which the pieces of provision information acquired are presented;

in the zoom-out mode, acquiring provision information regarding game play of another user selected on a basis of a predetermined selection condition among the pieces of provision information; and in the zoom-out mode, presenting the acquired provision information, wherein:

in the game-play mode, the user is presented with a full size game screen having a full sized periphery defining a full size square area of a game field containing one or more full sized objects for engaging in gameplay, upon instruction by the user, the processing circuit switches to the zoom-out mode, in which the game screen is reduced from the full size to a reduced size game screen having a smaller periphery defining a smaller square area containing smaller versions of the one or more full sized objects, and the reduced game screen is presented to the user with some of the provision information simultaneously located outside the smaller periphery of the reduced game screen, and, and the presenting includes permitting the user to scroll past the reduced game screen to view more of the provision information.

* * * * *